March 5, 1968  E. L. NEWMAN  3,372,382

DATA PROCESSING APPARATUS

Original Filed July 28, 1960  7 Sheets-Sheet 1

INVENTOR.
ERWIN L. NEWMAN
BY John V. Regan
ATTORNEY

Fig 3

March 5, 1968  E. L. NEWMAN  3,372,382
DATA PROCESSING APPARATUS
Original Filed July 28, 1960  7 Sheets-Sheet 4

INVENTOR.
ERWIN L. NEWMAN
BY John V. Regan
ATTORNEY

INVENTOR.
ERWIN L. NEWMAN
BY John V. Regan
ATTORNEY

United States Patent Office 3,372,382
Patented Mar. 5, 1968

3,372,382
DATA PROCESSING APPARATUS
Erwin L. Newman, Philadelphia, Pa., assignor to Radio Corporation of America, a corporation of Delaware
Continuation of application Ser. No. 46,017, July 28, 1960. This application Aug. 16, 1965, Ser. No. 482,031
13 Claims. (Cl. 340—172.5)

This is a continuation of application, Ser. No. 46,017, filed July 28, 1960, now abandoned.

This invention relates to data processing systems, and particularly to electronic digital processing apparatus wherein the data is expressed in digital notation.

In electronic data processing apparatus, for example, a digital computer, a memory device is used for storing the digital numbers representing the data. The data stored in the memory includes the information to be processed and the instructions for controlling the processing operations. Each separate memory location is designated by an address number. Such a machine is commonly referred to as a stored program system. Often in stored program systems, the information to be processed is stored in ordered locations in one portion of the memory, and instructions are stored in ordered locations in another portion of the memory. During processing, an address number is used for reading data into and out of any selected memory location. Many processing operations require the sequential selection of a group of related memory locations. For example, a transfer operation may cause the data in locations $n$, $n+1$, and so on, to be transferred to locations $m$, $m+1$, and so on, or the data in a sequential group of locations may be read from or written onto a tape. Another example of sequential selection is the use of cycling or looping procedures where the same set of instructions are repeatedly applied to information units. It is apparent that the information or instructions in such operations can readily be obtained from and written into the memory by successive additions to or subtractions from the address of the memory location of the first data unit.

The desired sequential operation can be achieved in a number of different ways. One way is to program the separate additions or subtractions as separate steps of the program. This procedure, however, is undesirable since it greatly complicates the writing of the program and unduly slows the machine operation. Another way is to use reversible binary counters as the addressing registers. Reversible binary counters, however, are relatively complex and expensive, particularly when high-speed operation is desired. The use of reversible binary counters is even less desirable when a number of separate addressing units are used to gain access to the memory since a number of relatively simple registers is replaced by a like number of relatively complex counters. Still another way of obtaining the desired sequential operation is to use a number of auxiliary accumulators with the registers. The auxiliary accumulators are simplified in that they are arranged to provide only for addition and subtraction operations. The use of auxiliary accumulators also results in increased complexity and expense and further require additional operating time.

One object of the present invention is to provide a relatively simple means by which an address or other stored number may be incremented and decremented as desired and at a relatively high-speed.

Another aspect of data processing apparatus is that a very high degree of reliability is required. Since different coded groups of binary signals or pulses correspond to different information characters, then it is necessary that some checking means be provided to insure that no signals or pulses are added to or lost from a given group during the processing operation. One common checking means is termed parity checking. In systems using parity checking either an odd number of an even number of binary "one" digits is used in every coded group. Parity checking, however, as employed in the prior art, is not suitable for checking the arithmetic portions of the system. Arithmetic operations may be checked by duplicating the equipment and comparing the results, or by using special mathematical checks, such as casting out nines. These arithmetic checks usually involve considerable extra equipment, and often require additional operating time.

Another object of the present invention is to provide an improved means for checking the arithmetic portion of a data processing system.

A further object of the invention is to provide an improved means for checking an arithmetic operation independent of the circuits used in the arithmetic unit.

Additionally, it is desirable to provide a check on the address information sent to the memory from the incrementing storage units to determine whether it is of the correct parity.

Thus, another object of the present invention is to provide an improved means for such parity checking.

According to the present invention, a storage register together with an adder unit function in the manner of a reversible binary counter for incrementing or decrementing by a desired amount a number initially stored in the register. The adder may also function as a temporary storage register. The adder unit is arranged to receive a number from the storage register, modify it in the desired manner and return it, thus modified, to the storage register. The modification of the number is determined by control signals which are also applied to the adder. The single adder unit may be coupled to a plurality of storage registers, such that at any one time any selected one of the registers can be operated in a manner of a reversible binary counter.

Further, the adder unit is arranged to operate as a temporary storage unit in which the information received from the storage register is returned unaltered, at a later time to the same storage register.

Another feature of the invention resides in an improved arrangement for ascertaining when predetermined addresses are established in the registers.

According to another aspect of the invention, the adder unit includes a parity modifier circuit separate from the arithmetic portion of the adder. The parity modifier circuit then changes or does not change the parity of the incoming number, depending upon the arithmetic operation involved to produce the resultant number. The resultant number is then checked for correct parity and a parity error signal is generated when the arithmetic portion of the adder is operating improperly. Further, assuming proper operation of the adder, received information from a register which is incorrect will be detected at the output of the adder circuit by the parity check circuit.

Figure 1:
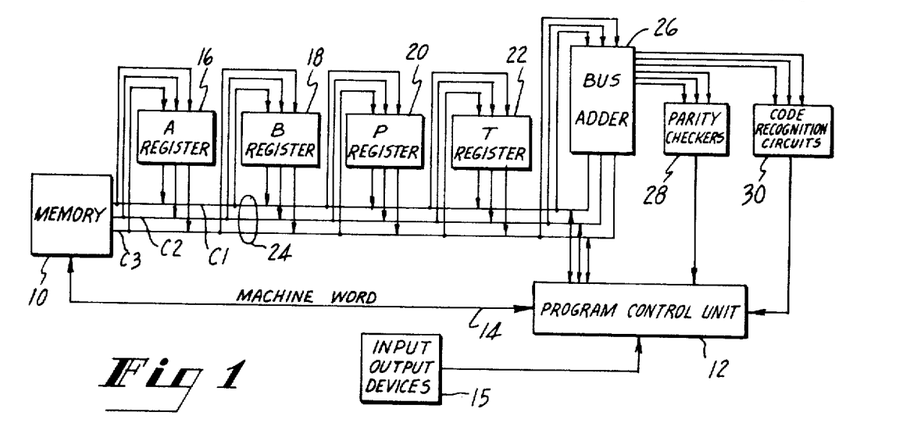
FIG. 1 is a block diagram of one embodiment of a data processing system according to one arrangement of the present invention.

The invention may be employed in a stored program machine of the bus type as shown in FIG. 1. In a bus type machine, information is transmitted along one or more buses between the various units of the system. Suitable gating networks are used to interconnect the various units with the common buses. The information to be processed and the instructions for controlling the processing is stored in a memory unit 10. The memory unit may be of the random access type, as in most high-speed computers currently in use, or it may be of the serial type such as a magnetic disc or drum. Within the memory unit 10 are included suitable registers for storing an address, decoding and gating circuits for addressing the memory at the stored address and for gating the information read out to other portions of the machine.

The information is handled on "word" basis. A "word" comprises a fixed number of binary digits (bits). The groups of bits in a "word" may be handled in parallel as in so-called parallel organized machines or in serial as in so-called serial type machines. The "words" themselves may be handled in parallel or serially. The present invention is described as organized in the serial word, parallel bit type arrangement; although it is understood it may be rearranged in known fashion to provide other types of operation.

The machine "word" or any desired portion of the machine "word" is gated between the memory 10 and the program control unit 12 via a bus 14. The program control unit 12 is assumed to include the various logic, control, and arithmetic units required for the operation of the system. The program control unit also may include a timing pulse generator for generating recurrent groups of timing pulses. Input information may be coupled between the program control unit 12 and suitable input and output devices 15. The input-output devices 15 may include, for example, magnetic tape, punched cards, paper tapes, etc.

A plurality of registers 16, 18, 20 and 22 designated as the A, B, P and T registers are used in the machine. Each register includes a plurality of bistable stages, each stage storing one bit of the word, gating circuits between the bus and register input and between the register output and the bus. The registers may be used as instruction or address controlling registers. These registers aid in achieving high-speed operation and permit greatly increased flexibility of programming. For example, in so-called three-address machines, one of the three registers, for example A, would be employed to determine the start location of an information unit. The second of the registers, for example B, would be used to designate the location of the last unit of information, and a third of the registers, for example P, would be used to designate the next address to which the operation is to proceed. Another example is an addition operation involving multi-digit numbers. In such case the address of the initial addend digit is set into one register; the address of the initial augend digit is set into a second register; and the address of the result is set into the third register. Then during each successive add cycle the three registers are incremented or decremented by fixed amount.

The registers 16–22 are coupled to the memory 10 via a bus 24 indicated by the three lines $C_1$, $C_2$ and $C_3$.

The bus 24 is also coupled to the program control unit 12 and an adder unit 26.

Parity checking circuits 28 and code recognition circuits 30 are coupled to the Bus Adder 26. The term "adder" as used herein includes a device capable of adding or subtracting as desired a fixed increment, including zero, to or from a number received at its input. As described hereinafter, the Bus Adder 26 performs a number of processing functions in the system; specifically, the Bus Adder (1) permits any of the registers 16–22 to be operated in the manner of a reversible binary counter with a greatly reduced amount of circuitry; (2) may be used to insure the correct transmittal of information between any of the registers and the memory; (3) may be used to provide a temporary storage for storing information from any one of the registers; and (4) the Bus Adder provides a simple means for detecting when a particular address of the memory is reached during a cycling operation.

For convenience of description, it is assumed that the bus 24 has provisions for carrying a "word" of 21 bits in length. The 21 bits of the "word" are divided into three characters, C1, C2 and C3 each of seven bits. The seventh bit of each character is the parity bit. The remaining 18 bits are sufficient for addressing 261, 824, i.e., $2^{18}$, memory locations. Further, it is assumed that these memory locations will be addressed in accordance with a known arrangement, beginning at an initial address. For example, successive ones of the memory locations may be addressed starting at the initial location. In such case, the initial address is set into one of the registers 16–22 and during each memory cycle that one register is incremented or decremented by a count of one to obtain the address of the next memory location, etc. Also during an operation, different increments or decrements may be added to or subtracted from the initial address during successive cycles of operation. It will be further assumed herein that the adder 26 is organized such that either increment of 0, 1, or 4 are added to the initial address, or the initial address is decremented by 0, 1, 4, or 8. For convenience of description, the increments are expressed in decimal form although they are represented in binary form in the apparatus.

Figure 2:
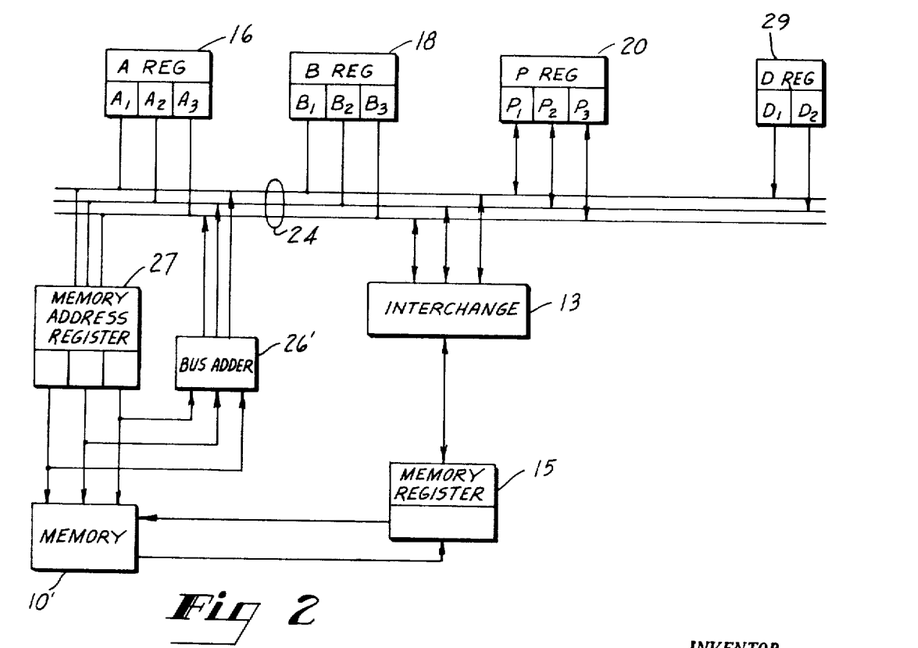
FIG. 2 is a block diagram of another embodiment of a data processing system according to the invention.

In FIG. 2, a data processing system is arranged such that the Bus Adder 26' is coupled between the output of a memory address register 27 and a three character bus 24'. The A, B and P registers 16, 18 and 20 are coupled to the bus 24' as in FIG. 1. Also a fourth register, termed a D register 29 is coupled to the bus 24'. The D register 29' as illustrated, is a two character register. Information flow on the bus 24' is controlled by an interchange unit 13 connected between the bus 24' and a memory register 15.

The operation of the system of FIG. 2, with respect to the Bus Adder 26', is similar to that of FIG. 1 with the exception that the information is first transferred to the memory address register 27 before modification by the Bus Adder 26'.

Figure 3:
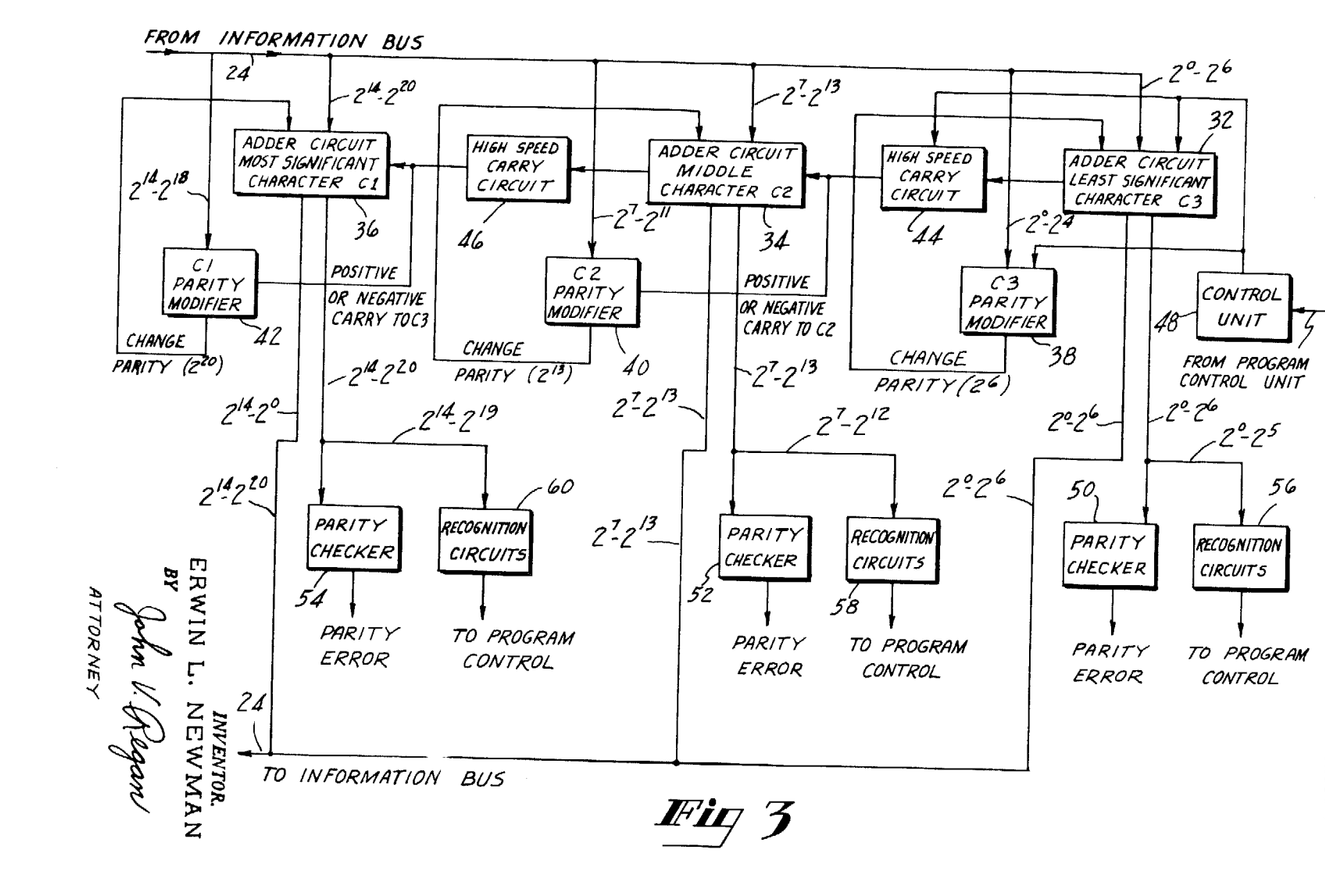
FIG. 3 is a schematic diagram in block form of an adder circuit 25 of FIG. 1.

A more detailed diagram of the Bus Adder is provided in FIG. 3. The character C3, indicated as the least significant character of the "word," is applied to an adder circuit 32. The middle character C2 is applied to an adder circuit 34, and the most significant character C1 is applied to an adder circuit 36. Four of the six information bits $2^0$–$2^6$ of the C3 character are applied to a parity modifier circuit 38. Four of the six information bits $2^7$–$2^{12}$ of the middle character C2 are applied to a character modifier circuit 40; and four of the six information bits $2^{14}$–$2^{19}$ of the character C1 are applied to a third character modifier circuit 42.

Each of the C3, C2, and C1 parity modifier circuits is arranged to provide an output signal which is applied as a separate input signal to the respective C3, C2 and C1 added circuits. An input signal from the parity modifier is used in changing the parity digit of the resulting character C1, C2, or C3 to maintain odd parity. A pair of high-speed carry circuits 44 and 46 are connected between the adder circuits C3, C2 and C2, C1, respectively. The circuits 44 and 46 insure that the desired increment is added to the register "word" within a single memory cycle. A control unit 48 is connected to the C3 adder circuit 32, the high-speed carry circuit 44, and the C3 parity modifier circuit 38. The control unit 48 provides the control signals for controlling the amount by which the "word" is incremented or decremented. In practice, the control unit 48 may be a part of the program control unit 12 (FIG. 1).

A separate parity checker is connected to the output of each of the adder circuits (FIG. 3). The $2^0$–$2^6$ bits of the C3 adder circuit 32 are applied to a parity checker 50, the $2^7$–$2^{13}$ outputs of the C2 adder checker 34 are applied to the parity checker 52, and the $2^{14}$–$2^{20}$ outputs of the C1 adder circuit 36 are applied to a parity checker 54. Parity checkers are well known in the art. Odd parity checkers are arranged to provide an output signal indicating a parity error whenever an even number of binary "ones" appear in the character applied to its inputs. In systems employing even parity, the parity checker is arranged to provide an output signal when a character applied to its inputs has an odd number of "ones." The $2^0$–$2^5$ outputs of the C3 adder circuit 32 are also applied to a recognition circuit 56; the $2^7$–$2^{13}$ outputs of the C2 adder circuit 34 are applied to a recognition circuit 58; and the $2^{14}$–$2^{19}$ bits of the C1 adder circuit 36 are applied to a recognition circuit 60. The parity bits of the characters are not used in the recognition circuits since they do not pertain to information.

The $2^0$–$2^{20}$ outputs of the C1, C2 and C3 adder circuits are gated to the bus 24, as indicated in FIG. 1, and to the program control unit 12. The outputs of the parity checker circuits and the recognition circuits may also be applied to the program control unit 12 which responds to these signals in a manner determined by the logical arrangement of the system. For example, a parity error signal may cause a rerun procedure to be initiated. During the rerun the last operation is repeated, to determine whether or not a transitory error occurred. If it is determined that the error is non-transitory, a shut-down signal may be generated. The output of the recognition circuits 30 may be used as conditional jump signals, to cause the machine to transfer to the next programmed instruction, and so on.

Figure 4:
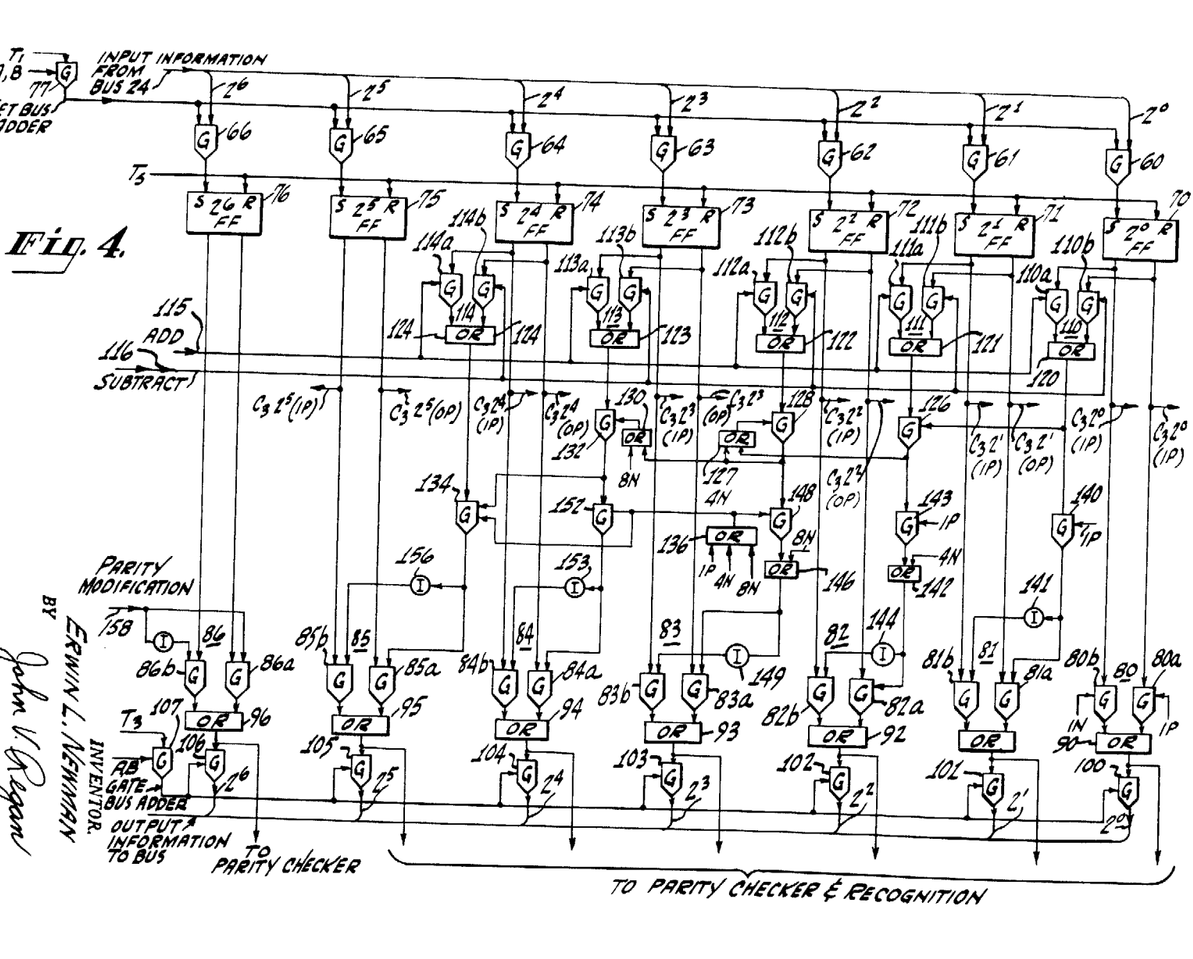
FIG. 4 is a schematic diagram of the portion of the adder circuit for the least significant character C3.

FIG. 4 is a detailed diagram of the C3 adder circuit 32. The C2 and C1 adder circuits are arranged generally similar to that of C3 except that they are somewhat simpler since in the exemplary embodiment the only arithmetic performed on the C2 and C1 characters is ±1 from the high-speed carry circuits. The adder circuit 32 performs in the manner of a binary adder in which a high output is produced at an output gate when an odd number of 1's are to be added at that position, and produces a low output when none or an even number of 1's are to be added at that position. A carry signal also is produced by high-speed carry circuitry when three 1's are to be added at any position. The carry signals are grouped to reduce the settling time of the adder. The settling time corresponds to the number of "and" or "or" stages in series through which a signal must be transmitted before a correct result is obtained. The procedure of grouping the carry signals reduces the length of the series chain so that the entire settling time of the 21-digit adder comprising the stages C3, C2 and C1 is less than the delay between the timing pulses T1, when the number is gated into the bus adder and the trailing edge of T3 when the resultant number is gated from the bus adder. This high carry operating speed is necessary so that the number can be taken from its desired one of the registers, gated to the bus adder, modified, and gated back to a desired register, all within the single cycle.

The seven bits $2^0$–$2^6$ of the C3 character are gated via six two-input "and" gates 60–66 to be set inputs (s) of seven flip-flops 70–76. The "and" gates are designated in the drawings by a "G" within a box. The output side of the box is tapered. The input signals may be applied to any of the three straight sides of the box. Each of the "and" gates used herein are circuits arranged to have a plurality of inputs and an output. An output signal of relatively high level is produced when and only when relatively high input signals are applied concurrently to all the inputs. Suitable "and" gate circuits are known in the art.

It will be assumed herein that a binary "1" signal is represented by a relatively high level or a positive pulse. A binary "0" signal is represented by a relatively low level, or the absence of a pulse.

Each of the flip-flops herein is a bistable unit having two separate inputs and two corresponding outputs. The inputs are designated "Set" (S) and "Reset" (R), respectively. When a flip-flop is in the "Set" condition, a relatively high level is produced at the "1" output side and a relatively low level is produced at the "0" output side. When the flip-flop is in the "Reset" condition, a relatively high level is produced at the "0" side, and a relatively low level is produced at the "1" side. Suitable flip-flop circuits are also known in the art.

Figure 5:
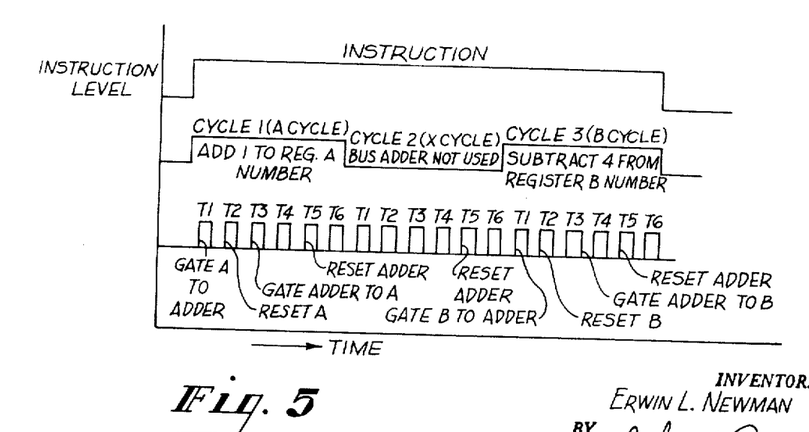
FIG. 5 is a timing diagram useful in explaining the operation of the present invention.

The illustrated data processing apparatus is operated under the control of operation levels and timing pulses in the manner of a synchronous machine. However, it is to be understood that the invention is applicable to asynchronous machines. FIG. 5 is a simplified timing diagram having an instruction level, a series of three operating cycles, with six timing pulses T1–T6 in each cycle. The uppermost line corresponds to a complete instruction level. As shown in the middle line, it is assumed that the number stored in the A register is to be incremented by one during the first or A cycle; during the second or X cycle the numbers stored in the registers are not changed; and during the third or B cycle the number stored in the B register is decremented by 4. The series of timing pulses are shown on the bottom line.

The instruction level together with the cycle levels and the timing pulses are used to gate the information signals between different portions of the systems. For example, during the A cycle, the word in the "A" register is gated to the Bus Adder 26 at time T1, the A register is reset at time T2, at time T3 the resultant word is gated from the Bus Adder to the A register, and at time T5 the bus adder is reset. The operation proceeds in similar fashion during each of the other cycles using the Bus Adder. The timing arrangement for the FIG. 2 system would be slightly different because of the presence of the memory address register 27 between the storage registers and the Bus Adder. For example in the FIG. 2 arrangement, the "word" in the A register may be gated to the memory register at time T1, and gated to the Bus Adder 26' at time T2.

As shown in FIG. 4, the information from the bus 24 is gated into the flip-flops 70–76 under the control of the A or B level and the T1 pulse. These flip-flops are initially reset due to a T5 pulse of a previous timing cycle, or by a special signal (not shown) generated during the start of any instruction. The T5 signal is applied to the reset input of each flip-flop 70–76. The A level and T1 signal are applied to "and" gate 77 which has an output connected to one input of each of the input "and" gates 60–66. Thus, any one of the "and" gates 60–66 provides a signal to set its associated one of the flip-flops 70–76 during timing signal T1 when a binary "1" signal appears on the corresponding digit line $2^0$–$2^6$. When a binary "0" signal appears on a $2^0$–$2^6$ signal line, the associated flip-flop remains reset. The timing signal T5 is applied to the reset input "R" of each of the flip-flops 70–76 during each cycle of operation.

The "0" outputs of the flip-flop 70–76 are coupled, respectively, to an input of a different one of seven pairs of sum "and" gates 80–86. The sum "and" gates are used to change, when necessary, the digits stored in the corresponding flip-flops from "0" to "1," or vice versa. The two gates of each of the pairs of sum gates are designated by the letters $a$ and $b$. The $a$ and $b$ gates are coupled to the "0" and "1" sides, respectively, of their corresponding flip-flops. Both outputs of each of the pairs of sum gates 80–86 are coupled via seven sum "or" circuits 90–96 to seven output gates 100–106. Each of the output gates 100–106 is activated by a signal from "and" gate 107. The "and" gate 107 receives one of the Bus Adder level signals A, B at one of its inputs and the timing pulse T3 at its second input. Each of the "or" circuits described herein are logic circuits having two or more inputs and an output. An "or" circuit operates to provide a high output level when any one or more of the input signals are high. A low output level is produced by and "or" circuit when all its inputs are at a low level. Suitable "or" circuits are well known in the art. In the drawing, an "or" circuit is designated by a rectangle with each separate input indicated by an arrow pointing towards the gate, and the output is designated by an arrow pointing away from the gate.

The "1" and "0" sides of the flip-flops 70–74 are connected to five pairs of carry "and" gates 110–114. The two "and" gates of each pair are designated by $a$ and $b$ with the $a$ gate being coupled to the "0" side of its corresponding flip-flop and the $b$ gate being coupled to the "1" side of the same flip-flop.

The circuitry between the flip-flops 70–76 and the output gates 100–106 is used for asynchronously generating the correct sums and high-speed carry digits for the resultant number. The pairs of gates 110–114 are used for high-speed carry generating purposes. A high-speed carry is one which is produced as the resultant of the stored digits in the flip-flops and the arithmetic operation without requiring previous carry signals to be propagated from the lower order to the higher order positions of the number. That is, the high-speed carry digit is generated at the same time, or nearly the same time, at each digit position. A high-speed carry digit produced during an add operation is termed herein a "positive" high-speed carry; a carry produced during a subtract operation is termed herein a "negative" high-speed carry. The gates 110a–114a of the pairs 110–114 are used in generating a "positive" high-speed carry, and each has one input connected to a common add line 115. A second input of each of the gates 110a–114a of the pairs 110–114 is connected to the "1" output of its associated one of the flip-flops 70–74. The gates 110b–114b are used in generating a "negative" high-speed carry and each has one input connected to a common subtract line 116. Another input of each of the gates 110b–114b is connected to the "0" output of its associated one of the flip-flops 70–74. The add and subtract lines 115 and 116 are connected to the program control unit 12 (FIG. 1). The two outputs of each pair of the carry gates 110–114 (FIG. 4) are connected through a separate one of five carry "or" circuits 120–124. The carry "or" circuits 120–124 provide a high level output signal only when there is a possibility of producing a carry signal at the corresponding position of the binary number. For example, the flip-flop $2^0$ can produce a carry signal only when its is in the "1" condition and a "1" is being added, or when it is in the "0" position and a "1" is being subtracted. The two gates 110a and 110b provide for these two possibilities. In all other possibilities, no carry will be produced in the $2^0$ position. A similar analysis applies for each of the other "or" circuits corresponding to the $2^1$–$2^4$ positions. No carry anticipation gates need be associated between $2^5$ and $2^6$ flip-flops 75 and 76 because in the assumed example, the largest number added to the stored number is 4 (binary 000100) and the largest number subtracted from the stored number is 8 (binary 001000). Further, in order to reduce the equipment required for generation of the carry signals, the carry propagation is grouped with number positions $2^2$–$2^5$ arranged to provide simultaneous carry digits. As will be apparent hereinafter the maximum delay in generating any carry signal is six delay units where a delay unit represents the delay time of an "and" gate or an "or" circuit.

The carry digit provided at the output of "or" circuit 120 is coupled to one input of an "and" gate 126 to provide a carry signal to the $2^1$ position. The gate 126 receives the output of carry "or" circuit 121 at its second input. The output of "and" gate 126 is then connected through an "or" circuit 127 to provide a carry signal to the $2^2$ position. The gate 128 receives at its second input the output of carry "or" circuit 122. A second input designated 4N is applied to "or" circuit 127. The signal 4N is high only when binary 4 is to be added to or subtracted from the number. In such case, it is known immediately that a carry signal will be produced from the $2^2$ stage; the $2^2$ flip-flop is storing a binary "1."

The output of 'and" gate 128 is coupled through an "or" circuit 130 to provide a carry signal to one input of and "and" gate 132 of the $2^3$ position. The gate 132 receives at a second input the output of carry "or" gate 123. A signal 8N is applied to a second input of "or" circuit 130. The signal 8N is high only when a binary 8 is to be subtracted from the number. In such case, it is known immediately that a carry signal will be generated from the $2^3$ position, if the $2^3$ flip-flop 73 is in the "0" condition.

The output of "and" gate 132 is coupled to one input of an "and" gate 152 of the $2^4$ position. The gate 134 receives at a second input the output of "or" circuit 136. The three-input "and" gate 134 provides a carry signal from the $2^4$ position. The gate 134 has a second input connected to the carry "or" circuit 124, and a third input connected to "or" circuit 136. The "or" circuit 136 receives as inputs the control signals 1P, 4N and 8N. The signal 1P is high only when binary 1 is to be added to be added to or subtracted from the number. Each of these operations may cause, together with other conditions, a carry signal to be produced from the $2^4$ position of the number. In such case, the carry signal from the $2^4$ position is generated by the gate 134 without requiring previous carry signals to be propagated f om the $2^0$, $2^1$ or $2^2$ positions.

The resultant output digits from the adder are controlled by the pairs of sum gates 80–86. The gate 80a receives at its second input a signal 1P. The signal 1P is high only when a 1 is to be added to the number. The signal 1N is applied to the second input of the gate 80b. The signal 1N is high only when a binary "1" is to be subtracted from the number. At that time, the signal 1P is low. Thus, when the $2^0$ flip-flop is in the "0" condition, and a "1" is added to the number, an output signal is produced by the "and" gate 80a and passed by the "or" circuit 90 to enable the output "and" gate 100. If the $2^0$ flip-flop is storing a binary "1" and a 1 is to be added, the gate 80a is not enabled due to the low level from the "0" side of the flip-flop 70, and the gate 80b is not enabled due to the low level 1N input. Hence, no output signal is produced from either of the "and" gates 80 and the output "and" gate 100 is not enabled.

The pair of gates 81 in the $2^1$ position are enabled by the $2^1$ flip-flop 71 and the carry "and" gate 140 which receives as one input the signal 1P and as a second input the output of carry "or" circuit 120. The output of carry "and" gate 140 is applied directly to an input of "and" gate 81a and is also inverted by inverter 141 and applied to one input of "and" gate 81b. An inverter circuit is used where necessary to change a level received at its input to the opposite level; for example, a high level received at its input is changed to a low level at its output, and vice versa. In the drawing, an inverter circuit is represented by I inscribed within a circle. Suitable inverter circuits are well known in the art. The "or" circuit 91 provides a high output signal to the output gate 101 only when a resultant binary "1" digit is produced in the $2^1$ position of the number.

Thus, when the $2^0$ flip-flop is in the "1" condition and a 1 is added to the count, a high input is applied via gate 140 to one input of the gate 81a, and a low ipnut is applied to one input of the gate 81b. Further, if the $2^1$ flop-flop is in the "0" condition, and "and" gate 81a is enabled at both inputs providing a high level signal to output "and" gate 101. However, if the $2^1$ flip flop is in the "1" condition, neither of the pair of "and" gates 81 is enabled due to the low levels from inverter 141 and flip-flop 71 to the gates 81b and 81a, respectively. Hence, the "or" circuit 91 does not enable the output "and" gate 101 indicating a "1" digit in the resultant binary number.

The pair of gates 82 are controlled by the "and" gate 143 and "or" circuit 142. The output of "or" circuit 142 is applied directly to one input of "and" gate 82a and is inverted by inverter 144 and applied to an input of "and" gate 82b. The signal 4N is applied to a first input of "or" circuit 142, and the output of "and" gate 143 is applied at its second input. The "and" gate 143 has the signal 1P applied to a first input and the output of carry "and" gate 126 applied to its second input. The "or" circuit 142 provides a high output level when (1) a binary 4 is to be added to or subtracted from the number, or (2) when a binary "1" is to be added to the number and both the $2^0$ and $2^1$ flip-flops 70 and 71 are in the "1" condition. In either of these events when a "1" or "4" is added, it is apparent that the resultant $2^2$ signal from output "and" gate 102 is high when the $2^2$ flip-flop is in the "0" condition, and is low when the $2^2$ flip-flop is in the "1" condition. For example, if binary 4 is to be added to the number and the $2^2$ flip-flop is in the "1" condition, a low output is produced by the "or" circuit 92. This condition pertains because the "and" gate 82b is not enabled by the inverted output from "or" circuit 142, and the "and" gate 82a is not enabled due to the low level output from the "0" side of the $2^1$ flop-flop. Conversely, the "or" circuit 92 should produce a high output when 4 is added to the circuit and the $2^2$ flip-flop 72 is in the 0 condition. In this case, the "and" gate 82a is enabled at both its inputs to provide a high level output from the "or" circuit 92.

The pair of "and" gates 83 are controlled by "or" circuit 146 and "and" gate 148. The output of "or" circuit 146 is inverted in inverter 149 and is applied to an input of "and" gate 83b. The output of "or" circuit 146 is also applied directly to an input of "and" gate 83a. One input to "or" circuit 146 is applied by the signal 8N which is high when binary 8 is to be subtracted from the number. A second input of "or" circuit 146 is connected to "and" circuit 148 which receives as input, the output of carry gate 128. The second input of "and" gate 148 is connected to the output of "or" circuit 136.

The "or" circuit 93 in the $2^3$ position has a high output only when a binary "1" is produced in the $2^3$ position of the resultant number. Otherwise, a low output is provided. For example, when binary 8 is to be subtracted from the number and the $2^3$ flip-flop is in the "0" condition, then "and" gate 83a is enabled at both inputs to provide a high level via the "or" circuit 93. Conversely, when the $2^3$ flip-flop is in the "1" condition and 8 is subtracted from the number, the "or" circuit 93 output is at a low level because neither of the gates 83a or 83b is activated. At this time gate 83a is not enabled at the input connected to the "0" side of the $2^3$ flip-flop 73, and the "and" gate 83b is not enabled at the input connected to inverter 149.

If the $2^2$ and $2^3$ flip-flops are "1" and "1" is added to the number, "and" gate 128 provides a high level output which is appiled to one input of "and" gate 148, the second input 1P is applied to "and" gate 148 via "or" circuit 136. The output of gate 148 is then applied to enable "and" gate 83a. If the $2^3$ flip-flop is "0," then "and" gate 83a applies a high level signal to "or" circuit 93, and so on.

The pair of gates 84 control the resultant digit in the $2^4$ position of the number. One input to the gate 84b is coupled directly to the output of "and" gate 152. The output of "and" gate 152 is inverted by inverter 153 and applied to one input of gate 84b. The "and" gate 152 receives one input from "or" circiut 136 and receives the output of carry "and" gate 132 at a second input.

A high level output is produced by "or" circuit 94 when a binary "1" digit is produced in the $2^4$ position of the resultant number, and a low output when a "0" digit appears in the $2^4$ position. For example, when binary 8 is subtracted from the number, and $2^3$ digit is a "0," then a "1" output is produced in the $2^4$ position when the $2^4$ flip-flop 74 is in the "0" condition, and a "0" output is produced when the $2^4$ flip-flop is in the "1" condition.

When the $2^3$ flip-flop 73 is in the "0" condition during a subtract 8 operation, carry "and" gate 152 is enabled at the inputs connected to "and" circuit 132 and "or" circuit 136. The high level output of carry output "and" gate 152 is inverted by inverter 153 and applied as a high level output to "and" gate 84b. The second input of "and" gate 84a is enabled due to the high level from the "0" side of the $2^4$ flip-flop.

If the $2^3$ flip-flop is in the "1" condition during the subtract 8 operation, the "and" gate 132 is not enabled and the "and" gate 152 receives a low level input from the gate 132. The low level output of "and" gate 152 is inverted by the inverter 153 and is applied as a high level input to "and" gate 84b. Hence, if the $2^4$ flip-flop 74 is in the "1" condition, both inputs of "and" gate 84b are high and the output of "or" circuit 94 is high. Neither of the pairs of gates 84 has both of its inputs at a high level when the $2^4$ flip-flop 74 is in the "0" condition and the output of "and" gate 152 is low.

The pair of "and" gates 85 are controlled by the $2^5$ flip-flop 75 and carry "and" gate 134. The output of gate 134 is applied directly to an input of "and" gate 85a, and the output of gate 134 is applied via inverter 156 to an input of "and" gate 85b. The "or" circuit has a high level output when a binary "1" digit appears in the $2^5$ position of the resultant number, and a low output when a "0" digit appears in the $2^5$ position.

The $2^5$ digit in the illustrative embodiment is changed only when a carry signal is produced from the $2^4$ position. For example, when the $2^4$ and $2^3$ flip-flops 73 and 74 are in the "0" condition during a subtract 8 operation, then the inputs of gate 134 are all high and a high level output is produced by carry gate 134 and applied to gate 85a. This high level is inverted by inverter 155 and applied as a low level to "and" gate 85b. If the $2^5$ flip-flop 75 is in the "1" condition, the "or" circuit 95 provides a relatively low level output. And when the $2^5$ flip-flop 75 is in the "0" condition, "and" gate 85a is enabled and the "or" circuit 95 provides a relatively high level output.

No carry signal is applied to the $2^6$ digit of the number since this is the parity digit. The parity "and" gates 86 are used to modify the parity of the $2^6$ digit to provide a correct parity for the output digit.

Figure 7:
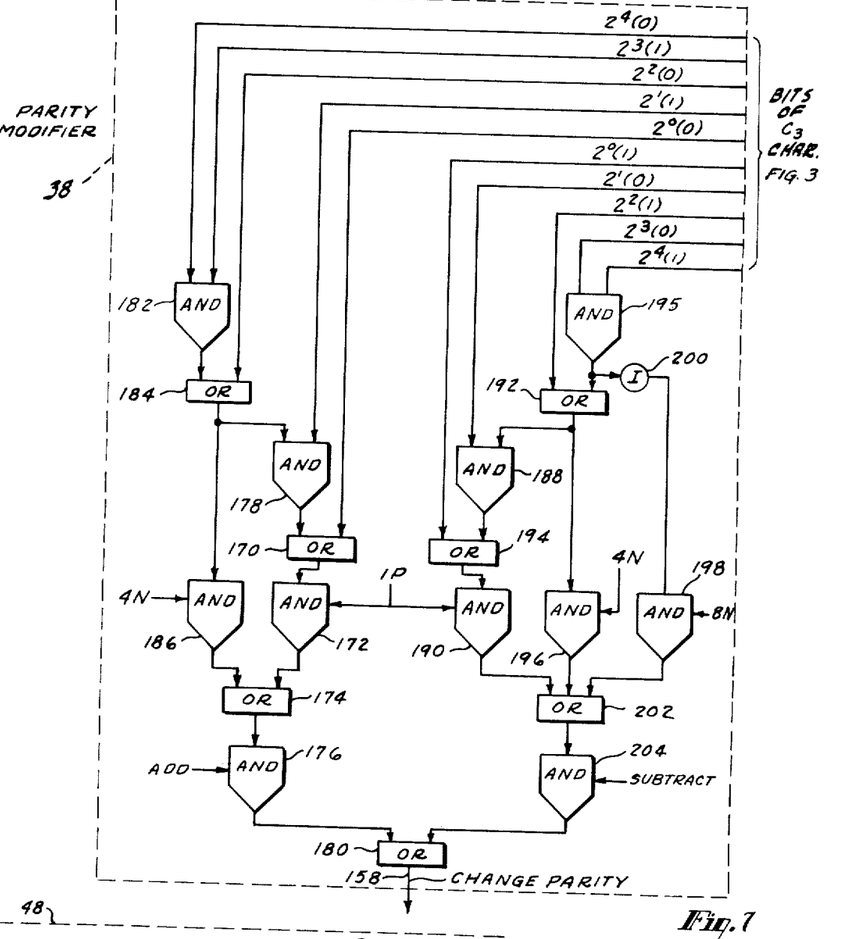
FIG. 7 is a schematic diagram of a circuit useful in the present parity modifier invention.

The inputs to the gates 86a and 86b are applied from a parity modification circuit (FIG. 7 on line 158). A high level signal on line 158 produces a change in the $2^6$ parity digit from "0" to "1" when the $2^6$ flip-flop is in the "0" condition. No change is produced when the $2^6$ flip-flop is in the "1" condition. Conversely, a low level input on the line 158 changes the $2^6$ digit from "1" to "0" when the $2^6$ flip-flop 76 is in the "Set" condition.

Figure 6:
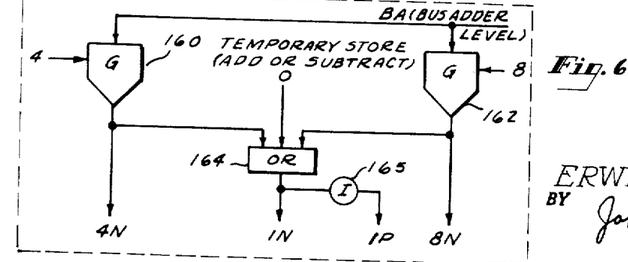
FIG. 6 is a schematic diagram of a control system for generating control signals used in the circuits of FIGS. 3 and 4.

The levels used in the adder circuit are generated by a control unit 48 (FIG. 1), shown in greater detail in FIG. 6. The control unit may be part of the program control unit 12 (FIG. 1), which generates control levels corresponding to the desired add or subtract operation and the number to be added or subtracted. As shown in FIG. 6, a level signal A or B is supplied as one input to each of a pair of gates 160–162 which receive inputs designated 4 and 8, respectively, in their second inputs. The 4 input to the gate 160 is high when a binary 4 is to be added to or subtracted from the number sent to the bus adder from one of the registers. The input of the "and" gate 162 marked 8 is high when a binary 8 is to be subtracted from the number sent to the bus adder. The output of gate 160 provides the level 4N used in the high-speed carry position of the circuit of FIG. 4. The output of gate 162 provides the level 8N used in the high-speed carry portion of FIG. 4. The output of the gates 160 and 162 are also applied to two inputs of "or" circuit 164. A third input of the "or" circuit 164, designated "0," is high when the number sent to the bus adder is not to be changed. In such case, the bus adder operates as a temporary storage register, for reasons more fully pointed out hereinafter.

The "0" level is also supplied from the program control unit. The output of "or" circuit 164 provides the level 1N. The output of "or" circuit 164 is also inverted in inverter 165 to provide the level 1P. The level 1P is high only when a binary 1 is to be added to or subtracted from the number sent to the bus adder. Thus, when any one of the inputs 0, 4 or 8 is high, the level 1N is high. The level 1P is high when all three inputs 0, 4 and 8 are low indicating that a 1 is to be added to the contents of the bus adder.

A detailed diagram of the parity modifier circuit is shown in FIG. 7. The input signals $2^0$–$2^4$ are received from the bus 24. If desired, however, the input signals may be supplied from the "0" and "1" sides of the flip-flops 70–74 (FIG. 4) as indicated by the output leads connected to these flip-flops. The left portion of FIG. 7 is used in the add operation, and the right portion is used during the subtract operation. In the exemplary embodiment 0, 1 or 4 may be added to the number and 0, 1, 4 or 8 may be subtracted from the number. The arrangement of FIG. 7 produces a relatively high output signal on line 158 only when the parity digit $2^6$ of the resultant number is to be changed. A relatively low output signal is produced when the parity digit $2^6$ is unchanged. The rules for changing parity are expressed in Table 1 below.

TABLE 1

| Bus Adder Positive | | | | | | Modification | Bus Adder Negative | | | | | |
|---|---|---|---|---|---|---|---|---|---|---|---|---|
| $2^5$ | $2^4$ | $2^3$ | $2^2$ | $2^1$ | $2^0$ | | $2^5$ | $2^4$ | $2^3$ | $2^2$ | $2^1$ | $2^0$ |
| X | X | X | X | X | 0 | 1 | X | X | X | X | X | 1 |
| X | X | X | 0 | 1 | 1 | | X | X | X | 1 | 0 | 0 |
| X | 0 | 1 | 1 | 1 | 1 | | X | 1 | 0 | 0 | 0 | 0 |
| X | X | X | 0 | X | X | 4 | X | X | X | 1 | X | X |
| X | 0 | 1 | 1 | X | X | | X | 1 | 0 | 0 | X | X |
| | | | | | | 8 | X | 1 | 1 | X | X | X |
| | | | | | | | X | 0 | 1 | X | X | X |
| | | | | | | | X | 0 | 0 | X | X | X |

X = 0 or 1.

The left column of the table sets out the digit configurations calling for a change of parity during an add operation. The middle column designates the digit (decimal equivalent) to be added to or subtracted from the number, and the right column sets out the digit configurations calling for a change of parity during a subtract operation. The letter X is used in the table to refer to either a "1" or a "0."

Considering an "add" 1 operation, it is seen that the parity bit $2^6$ is always changed when the $2^0$ digit of the C3 character is a "0." The parity bit may or may not be changed if the $2^0$ digit is a "1." The two cases in which it is changed are set out in the second and third rows of the left portion of the table. These two conditions occur when the $2^0$ and $2^1$ digits are "1" and the $2^2$ digit is a "0." The second change occurs when the $2^0$, $2^1$, $2^2$ and $2^3$ digits are "1" and $2^4$ digit is "0."

Each of the other portions of the table may be similarly analyzed. The three cases in which parity is changed (CP) during an "add" "1" operation can be expressed in the following equation:

$$CP = \overline{2^0} \text{ or } (2^0\ 2^1\ \overline{2^2}) \text{ or } (2^0\ 2^1\ 2^2\ 2^3\ \overline{2^4}) \quad (1)$$

In Equation 1, the presence of a number indicates a "1" digit in that position and a bar over the term represents a "0" in that position. The $2^5$ digit is not significant in the add 1 operation.

When the $2^2$ digit is "0" and binary 4 is added to the number, parity is always changed regardless of the remaining digits. When the $2^2$ digit is a "1" parity and binary 4 is added, the parity digit may or may not be changed. Parity is changed only when the $2^3$ and $2^4$ digits are "1" and "0," respectively. These two cases can be expressed in the following equation.

$$CP = \overline{2^2} \text{ or } (2^2\ 2^3\ \overline{2^4}) \quad (2)$$

Equation 1 above is implemented in FIG. 7 by "or" circuit 170, "and" gate 178, "or" circuit 184 and "and" gate 182. This network provides an output signal to "and" gate 172 which receives the level 1P at a second input. The output of "and" gate 172 is then passed by "or" gate 174 to "and" gate 176 which is enabled at its second input by the add level. The output of "and" gate 176 is passed by "or" circuit 180 to the output line 158. As described above the line 158 is connected to the sum gates of the $2^6$ flip-flop of the C3 adder circuit (FIG. 5).

Equation 2 above is implemented by "and" gate 182, "or" circuit 184 and "and" gate 186. The $2^4$ (0) and $2^3$ (1) signals enable both inputs of "and" gate 182, and its output signal is passed through "or" circuit 184 to one input of "and" gate 186. The $2^2$ (0) signal is applied to a second input of "or" circuit 184. The "and" gate 186 is enabled at its second input by the 4N level. The output of gate 186 is passed by circuit 174 to "and" gate 176.

A study of the add portion of FIG. 7 will disclose that the above conditions describe in Equations 1 and 2 the only possibilities which produce a high output signal on line 158. All other possible combinations of the $2^0$–$2^5$ digits of the C3 character do not produce an output signal because of the lack of one or more enabling signals, at the inputs of the gating circuits.

The subtract portion of the parity modifier circuit includes "and" circuits 188, 190 and "or" circuits 192 and 194 for implementing the subtract "1" operation. These four circuits operate similarly to the add "1" circuits except that the "1" and "0" signals are reversed. The subtract 4 operation is implemented by "and" gates 195, 196 and "or" circuit 192. These three gates function similarly to the gates 182, 186 and "or" circuit 184 of the add portion except that the "1" and "0" signals are reversed. The subtract 8 operation is implemented by "and" gate 94, "and" gate 198 and inverter 200. The inverter 200 provides a signal not $2^3$ (0) and $2^4$ (1) to the "and" gate 198 which is enabled at its second input by the 8N level. The separate outputs of gates 190–196 and 198 are coupled through an "or" circuit 202 to one input of an "and" gate 204. The "and" gate 204 is enabled at its second input by the subtract level. The output of "and" gate 204 is connected via "or" circuit 180 to the output line 158. A study of the right portion of the parity modifier circuit will show that a changed parity signal is applied to the line 158 only when a parity of the character C3 is to be changed during a subtract operation. No add or subtract "0" signals need be employed in the parity modifier circuit since parity is never changed during these operations.

Figure 8:
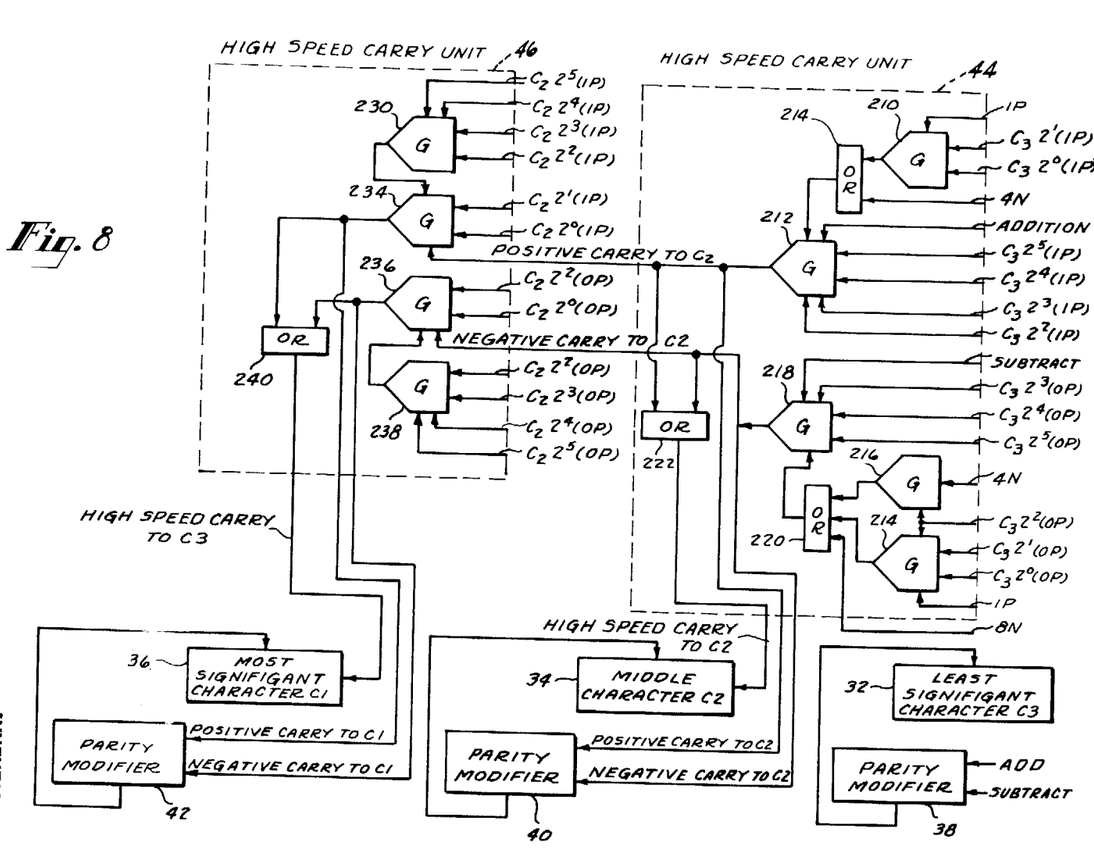
FIG. 8 is a schematic diagram of high-speed carry circuits useful in the arrangement of the adder circuit of FIG. 2.

A detailed diagram of the high-speed carry circuits 44 and 46 is shown in FIG. 8. The rules of operation of each of these carry circuits is that a high-speed carry is generated only when a "1" signal is added to a position of the number and all of these stages to the left of that position through $2^5$ are "1's."

The level 4N is applied via "or" circuit 214 as an enabling level to the gate 212. Thus, during an add 4 operation the gate 212 provides an output signal when the $2^2$ through $2^5$ positions of the C3 character are "1." At this time the gate 210 is not enabled due to the absence of the 1P level.

The high-speed carry generated during a subtraction operation is implemented by the "and" gates 214, 216, and 218 and "or" circuit 220. The "and" gate 214 receives as one input the level 1P and at three other inputs the signals $2^0$ (0), $2^1$ (0) and $2^2$ (0). The signal $2^2$ (0) is also applied as one input to the gate 216 which receives the signal 4N. The outputs of gates 214 and 216 are applied through "or" circuit 220 to one input of "and" gate 218. The gate 218 receives the signals $2^3$ (0), $2^4$ (0) and $2^5$ (0) at its second through fourth inputs and the subtract level at a fifth input.

The output of gate 218 is at a high level only when a high-speed carry is generated during the subtract operation. The output signal of each of gates 212 and 218 are applied through "or" circuit 222 to the $2^0$ position of the C2 character. This output signal together with the digit is stored in the $2^0$ flip-flop of the C2 character, produces a carry to the $2^1$ position in the manner similar to that described previously for the C3 character $2^0$ and $2^1$ digits during an add 1 operation. The output signal of "and" gate 212 is applied directly to one input of parity modifier circuit 40. The parity modifier circuit 40 operates similarly to the parity modifier circuit 38 of FIG. 7. However, the modifier circuit 40 is simpler since the only possibility is the addition or subtraction of "1" in the first ($2^0$) position. In such case, the add portion of the modifier circuit 40 need include gates corresponding to the "and" gates 182, 178 and 176 and "or" circuits 170, 174, 180 and 184 (FIG. 7). The "and" gates 172 and 186 of FIG. 7 are not required since only a "1" is added to the C2 character. The "positive" carry signal is applied as an enabling input to the gate corresponding to the gate 176 of FIG. 7.

The output signal of the high-speed carry gate 218 (FIG. 8) is applied directly to the parity modifier circuit 40 as a "negative" carry signal. The subtract portion of the modifier circuit 40 is also simpler than that of the modifier circuit 38 since it is required only to subtract "1" from the $2^0$ position. In such case, the gates corresponding to "and" gates 190, 196, and 198 of FIG. 7 and inverter 200 are not required. Also, the "or" circuit corresponding to "or" circuit 202 may be a two-output circuit. The "negative" carry signal is applied as an enabling input to the subtract gate of the parity modifier 40.

The high-speed carry circuit 46 of FIG. 8 is simpler than the carry circuit 44 since it is merely required to sense the "positive" or "negative" carry signal from the C3 character and combine this with the digits of the C2 character to produce a proper carry. Thus, if a "positive" carry is produced from the carry circuit 44 and $2^0$ through $2^5$ positions of the C2 character are "1," then a "positive" carry signal is produced. This positive carry is applied to the parity modifier circuit 42 for the C1 character. A "negative" carry signal is produced by the carry circuit 44 when the $2^0$ through $2^5$ positions of the C2 character are "0" and a "negative" carry signal is received from the carry circuit 44. The negative carry signal from the carry circuit 44 is applied to the parity modifier circuit 42.

In the C1 carry circuit 46, the "positive" carry signal is generated by the "and" gates 230, 234, and the "negative" carry signal is generated by "and" gates 236 and 238. The gate 230 receives the signals $2^0$ (1) and $2^1$ (1) at a second and a third of its inputs, and a "positive" carry signal from carry circuit 44 at a fourth input. The gate 238 receives the signals $2^2$ (1), $2^3$ (1) and $2^4$ (1), $2^5$ (1) signals at four of its inputs and its output is connected to the first input of the gate 234.

The signals $2^0$ (0) and $2^1$ (0) are applied to the second and third inputs of the gate 236 and the "negative" carry signal from the carry circuit 44 is applied to a fourth input. The output of the gate 238 is connected to the first input of the gate 236.

The outputs from the gates 234 and 236 are coupled through "or" circuit 240 as a high-speed carry input to the C1 adder circuit 36.

As described above, the Bus Adder circuit 26 may be arranged to increment or decrement the stored number by various amounts. In the case of the circuits already described, employing 1, 4 "and" 8 control signals, different amounts of incrementing can be achieved by varying the control signals during successive cycles of an instruction. For example, the stored number may be incremented by 3, by adding 4 and subtracting 1; or decremented by 3, by adding 1 and subtracting 4, and so on.

Figure 9:
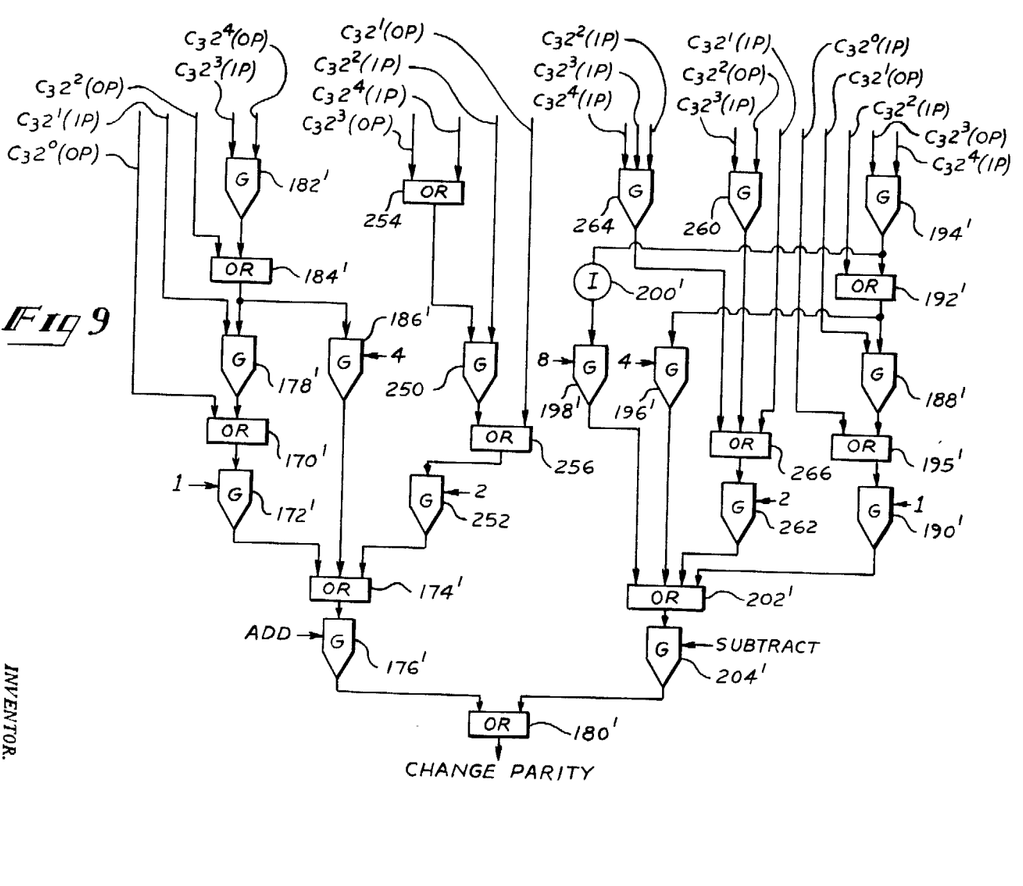
FIG. 9 is a schematic diagram of another embodiment of a parity modifier circuit useful in systems according to the present invention; and, FIG. 10 is a schematic diagram of a code recognition circuit useful in the present invention.

Another embodiment of a parity modifier circuit for use with an adder circuit, arranged for directly adding 0, 1, 2 and 4, or subtracting 0, 2, 4, or 8 from the stored number, is shown in FIG. 9. "And" gates and "or" circuits corresponding to those of FIG. 7 are given corresponding reference numerals with the addition of a prime (').

The additional gating elements required for adding binary 2 include "and" gates 250, 252 and "or" circuits 254 and 256. The "or" circuit 256 and "and" gate 252 provide an enabling level to the "and" gate 176' when the $2^1$ digit is a "0" and a binary 2(01) is added to the number. The "or" circuit 254 and "and" gate 250 provide an output signal during an add 2 operation when the $2^1$ digit is a "1," the $2^3$ and $2^4$ digits are "0."

The "or" circuit 254 and "and" circuit 250 also provide an output corresponding to the condition when the $2^0$ digit is a "1," and the $2^2$, $2^3$ and $2^4$ digits are "1" and a binary 2(01) is added to the number.

The subtract portion of the circuitry of FIG. 9 includes the additional add gates 260, 262 and 264, and "or" circuit 266. The "or" circuit 266 provides an output signal when the $2^1$ digit is a "1" and binary 2 is subtracted from the number. In this case, the parity digit is changed. A study of the remaining portions of the circuit will show that the "and" gates 260 and 264 provide output signals for the other possible configurations of the $2^1$ through $2^5$ digits when a 2 is subtracted from the number and parity is required to be changed.

In similar manner, the circuit may be arranged to increment or decrement the stored number by any arbitrary amount. For example, assume that the number is to be incremented by binary 010100. In such case, it is seen that the $2^0$ and $2^1$ bits do not enter into the parity modification since they do not affect parity. The remaining sixteen possible conditions are set out in Table II below:

TABLE II

| | $2^5$ $2^4$ $2^3$ $2^2$ | Parity Change | | $2^5$ $2^4$ $2^3$ $2^2$ | Parity Change |
|---|---|---|---|---|---|
| 1 | 0 0 0 0 | Yes | 9 | 1 0 0 0 | No |
| 2 | 0 0 0 1 | Yes | 10 | 1 0 0 1 | No |
| 3 | 0 0 1 1 | No | 11 | 1 0 1 0 | No |
| 4 | 0 0 1 1 | Yes | 12 | 1 0 1 1 | Yes |
| 5 | 0 1 0 0 | Yes | 13 | 1 1 0 0 | Yes |
| 6 | 0 1 0 1 | Yes | 14 | 1 1 0 1 | No |
| 7 | 0 1 1 0 | Yes | 15 | 1 1 1 0 | Yes |
| 8 | 0 1 1 1 | Yes | 16 | 1 1 1 1 | Yes |

Each of the sixteen different combinations of "1" and "0" digits are set out in a separate row of the table. The last column of each row indicates "yes" or "no" corresponding to a change or no change of the parity digit during the incrementing. The conditions requiring a parity change may be summarized in the following equation:

$$Cp = (\overline{2^5\ 2^4\ 2^3}) \text{ or } (\overline{2^4}\ 2^3\ 2^2) \text{ or } (2^4 \overline{2^3\ 2^2}) \text{ or } (2^4\ 2^3) \quad (3)$$

The parity modifying circuitry required for any other incrementing can be obtained in a similar manner. The high-speed carry portions of the adder circuit 32 (FIG. 4) are also modified to provide simultaneous carry signals, where necessary, when the incrementing or decrementing levels differ from those illustrated in FIG. 3.

Figure 10:
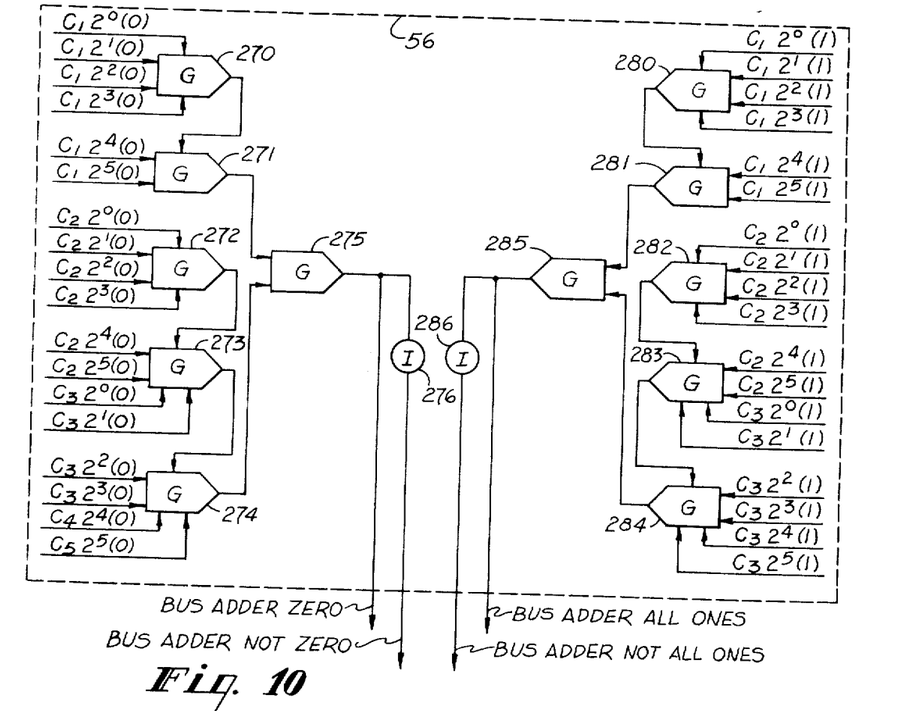

A schematic diagram of a pair of code recognition circuits 56 is shown in FIG. 10. The left portion of the figure provides gating circuitry for recognizing when the Bus Adder $2^0$–$2^{18}$ information digits are all "0." The three parity digits are not employed in the code recognition circuitry. The "0" sides of the $2^0$–$2^5$ flip-flops in each of the C1, C2 and C3 adder circuits are coupled respectively to the inputs of five "and" gates 270–274 as enabling signals. Conveniently, the eighteen signals are grouped among the five "and" gates 270–274. The outputs of the gates 270, 271 and 272, and 273 and 274 are applied to "and" gate 275. The "and" gate 275 produces a high level output only when the number stored in the Bus Adder is "0." This output, when high, may be used to cause the instruction presently using the bus adder to terminate and another instruction to be generated. The output of "and" gate 275 also may be inverted by inverter 276 to provide a high output signal when any number other than "0" is stored in the Bus Adder 26.

The five "and" gates 280, 284 of the right portion of the code recognition circuit are arranged to respond to the "1" sides of the $2^0$–$2^5$ flip-flop of each of the adder circuits.

A common "and" gate 270–285 receives the output signals from the two groups of "and" gates 280, 281 and 282, 283 and 284. Gate 285 provides a high level output when the count stored in the Bus Adder is a "1" in each of the positions of the number.

This output also may be used to terminate the instruction presently using the Bus Adder, to generate a new instruction, or for any other suitable purpose. The output of gate 285 also may be inverted by inverter 286 to provide high level signal when any other count except one having all "1's" is stored in the Bus Adder. The core recognition circuit may be arranged to recognize any other desired core in a similar manner.

What is claimed is:

1. In a data processing system having a memory with separate locations each designated by a separate address number, a plurality of registers for storing signals indicative of memory address numbers, an adder unit for modifying a received number by a specified quantity including zero and having first and second inputs, means for transferring address number signals from a selected one of said registers to said memory for selecting one of said memory locations and transferring the same address number signals to said adder unit first inputs, means for applying a set of signals representing said specified quantity by which the address number applied to the memory is desired to be modified to said adder unit second inputs, and means for transferring signals indicative of said modified address number thereby produced by said adder unit from said adder unit to one of said plurality of registers.

2. In a data processing system having a memory with separate locations each designated by a separate address number, registers for storing signals indicative of address numbers, an adder unit for modifying received number signals and having first inputs for receiving said address number signals and having a plurality of control input levels, said adder being arranged to modify a number received at said first inputs a different amount for each different control input level, means for transferring said address number signals from a selected one of said registers both to said memory and to said adder unit first inputs, means for applying a said control level to said adder second inputs, and means for transferring signals indicative of said modified address number from said adder unit to said one register.

3. In a data processing system having a memory with separate locations each designated by a separate address number, a plurality of registers for storing signals indicative of address numbers, an adder unit for receiving said address number signals and having a plurality of control level inputs, said adder unit modifying address number signals received at said first inputs by a specified quantity including zero and having first inputs and second inputs, in accordance with a control level applied to said control level inputs, means for concurrently transferring address number signals from a selected one of said registers both to said memory and to said adder unit first inputs, means for applying one of said control levels to said adder unit control inputs, and means for transferring said modified address number signals from said adder unit to one of said registers.

4. In a data processing system having a memory with separate locations each designated by a separate address number, a multi-digit transfer bus, a plurality of multi-digit registers for storing signals indicative of said number signals from and to said bus, and second inputs for receiving control signals, an adder unit for receiving and transferring address signals, from and to said bus, said adder unit being arranged to add or substract one of a plurality of numbers, including zero, to address number signals from said bus, said one number being determined by said control signals, means for transferring an address number from a selected one of said registers both to said memory and to said adder unit first inputs via said bus, means for applying a set of said control signals representing said specified quantity to said adder unit second inputs, and means for transferring said changed address number from said adder unit to one of said plurality of registers via said bus.

5. In a data processing system employing binary coded groups of signals for representing data and wherein a parity signal is used to maintain a fixed parity in each group, an adder circuit having inputs arranged for incrementing or decrementing a number defined by a group of signals received at said inputs in accordance with one or more control signals, a parity modifier circuit having inputs for receiving certain of said group of number signals and providing, when necessary, an output signal for modifying said parity signal of said received number signals in accordance with the amount by which said number signals are incremented or decremented, means for applying said number signal group and said parity signal to said adder circuit, means for applying said number signals and said one or more control signals to said parity modifier circuit, means for applying said parity modifier output signal to said adder circuit, and a parity checking circuit having inputs for receiving other signals representing said incremented or decremented number and providing an error signal when said received other signals have incorrect parity.

6. In a data processing system wherein information is represented by numbers and wherein each number has a plurality of information digits and a parity digit, means for changing said numbers by fixed amounts comprising an adder unit having inputs for receiving signals representing said information digits and control inputs for receiving control signals, each different control signal corresponding to a different one of said fixed amounts, a parity modifier circuit having inputs for receiving said control signals and at least certain of said information signals, said modifier circuit providing an output signal which is a joint function of said received certain information signals and said control signals, and a parity checking circuit connected to receive the information and parity signals representing a changed number and providing an error signal when said changed number is of incorrect parity.

7. A checking circuit for a binary adder-subtractor unit comprising an adder-subtractor unit having a set of inputs for receiving signals representing a binary number and a set for inputs for receiving signals representing a quantity to be added to or subtracted from said number to produce a resultant number, each of said binary and resultant numbers having a unique group of binary information digits, and a parity modifier circuit having inputs for receiving said quantity signals and at least certain of said binary number signals, said modifier circuit generating a parity signal independent of said adder-substractor unit in accordance with said certain number and said quantity signals, means for combining said independent parity signal with the information signals of said resultant number, and a parity checking circuit connected to receive said combined resultant number signals.

8. In a data processing system having a bus for carrying coded groups of signals, each group including information signals and a parity signal, the combination comprising registers for storing said groups of signals, an adder-subtractor unit for adding or subtracting a quantity to or from a number received at its inputs to provide a resultant number, said unit including an arithmetic portion and a parity modifying portion, means for coupling a desired one of said registers to said bus for transmitting a stored number to said unit, all said information signals being applied to said arithmetic portion and at least some of said information signals being applied to said parity modifying portion, means for applying signals representing said quantity to said arithmetic and modifying portions, said modifying portion generating an output signal under the joint control of said information and quantity signals, said arithmetic portion providing output signals representing the resultant of said information and quantity signals, and means for combining the output signal of said modifying portion with the parity signal of said transmitted number to provide a parity signal for said resultant number, and means for gating the group of signals representing said resultant number to said one register.

9. In a data processing system the combination as recited in claim 8, including a parity checking circuit connected to receive the said group of signals representing said resultant number.

10. In a data processing system, the combination as recited in claim 8 including a plurality of code recognition circuits connected to receive the group of signals representing said resultant number, each different said recognition circuit providing an output signal when signals representing a unique one of said resultant numbers is received by that one circuit.

11. A checking circuit for a binary adder-subtractor unit, said unit operating to add or subtract a binary quantity, including zero, from a binary number to obtain a resultant number, said binary number including number digits and a parity digit, said checking circuit comprising a parity modifier circuit connected to receive signals representing said quantity and signals representing at least certain but less than all of said binary number digits, said modifier circuit generating a parity signal as a joint function of said received binary number and quantity signals, means for combining said generated parity signal with a signal representing the parity digit of said binary number to obtain a resultant parity digit, and a parity checking circuit connected to receive signals representing the number digits and the parity digit of said resultant number.

12. In a data processing system having data represented in the form of words, each word including a plurality of characters and each character including a plurality of data signals and a parity signal, an adder checking circuit for adding or subtracting a fixed quantity from a received word to provide a resultant word and providing an error signal when the resulant received word is incorrect comprising a separate adder unit for each character of said word, the data signals of the respective characters being applied to the respective adder units, a separate parity modifier circuit for each character of said received word, each parity modifier circuit receiving at least certain but less than all of the signals representing a different one of said characters and signals representing the quantity to be added or subtracted from the data signals of its corresponding character, said parity modifier circuits each providing an output signal under the joint control of its received data and quantity signals, and each said output signal being used to change, when necessary, the parity signal of the corresponding resultant character, and a separate parity checking circuit for each character arranged to receive the data and parity signals of the separate resultant characters.

13. The combination comprising a binary adder for receiving signals representing an input number and signals representing a quantity to be added or subtracted from a said number to provide a resultant number, each group of said input number signals including a parity signal, a parity modifier circuit for receiving said quantity signals and certain of said input number signals, said modifier providing an output signal for changing the parity signal of said input number under the joint control of said certain signals and said quantity signals, means for applying said parity modifier output signal to said binary adder to generate a new parity signal when said resultant number has a parity different from said input member, and a parity checking circuit for receiving the resultant number signals and providing an error signal when said resultant number is of incorrect parity.

No references cited.

ROBERT C. BAILEY, *Primary Examiner.*

P. R. WOODS, *Assistant Examiner.*